United States Patent
Clingman

(10) Patent No.: US 7,834,301 B2
(45) Date of Patent: Nov. 16, 2010

(54) SYSTEM AND METHOD FOR CONTROLLING HIGH SPIN RATE PROJECTILES

(75) Inventor: Dan J. Clingman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 12/112,884

(22) Filed: Apr. 30, 2008

(65) Prior Publication Data
US 2009/0272839 A1    Nov. 5, 2009

(51) Int. Cl.
*F41G 7/00* (2006.01)
*F41G 9/00* (2006.01)
*F42B 15/01* (2006.01)
*F42B 15/00* (2006.01)

(52) U.S. Cl. .................. 244/3.15; 244/3.1; 244/3.23; 102/501

(58) Field of Classification Search ........... 244/3.1–3.3; 89/1.11; 102/501, 517, 382, 384
See application file for complete search history.

(56) References Cited

U.S. PATENT DOCUMENTS

| | | | |
|---|---|---|---|
| 3,456,134 A | | 7/1969 | Ko |
| 4,399,962 A | * | 8/1983 | Wedertz et al. ............ 244/3.23 |
| 4,579,298 A | * | 4/1986 | Thomson ................... 244/3.21 |
| 4,756,492 A | * | 7/1988 | Kranz ....................... 244/3.1 |
| 4,793,571 A | * | 12/1988 | Kranz ....................... 244/3.1 |
| 4,925,130 A | * | 5/1990 | Kranz ....................... 244/3.21 |
| 5,139,216 A | * | 8/1992 | Larkin ....................... 244/3.21 |
| 5,751,091 A | | 5/1998 | Takahashi et al. |
| 5,788,178 A | * | 8/1998 | Barrett, Jr. ................. 244/3.11 |
| 6,236,143 B1 | | 5/2001 | Lesieutre et al. |
| 6,364,248 B1 | * | 4/2002 | Spate et al. ................. 244/3.23 |
| 6,474,593 B1 | * | 11/2002 | Lipeles et al. .............. 244/3.21 |
| 6,646,242 B2 | * | 11/2003 | Berry et al. ................. 244/3.1 |
| 6,858,970 B2 | | 2/2005 | Malkin et al. |
| 6,894,460 B2 | | 5/2005 | Clingman |

FOREIGN PATENT DOCUMENTS

WO    WO 02/086981    10/2002

OTHER PUBLICATIONS

Ibond Jung, Yongrae Roh, "Design and fabrication of piezoceramic bimorph vibration sensors," 1998.

(Continued)

*Primary Examiner*—Bernarr E Gregory
(74) *Attorney, Agent, or Firm*—Harness, Dickey & Pierce, P.L.C.

(57) ABSTRACT

A method is disclosed for controlling a flight trajectory of a spinning projectile. In one aspect the method may involve supporting a nose of the projectile in a manner permitting the nose to be wobbled. At least one electrically responsive component may be coupled at a first end to the nose and at a second end to a base portion of the projectile. An angular position of the nose of the projectile may be sensed as the projectile flies through an atmosphere after being fired from a weapon. An electrical signal is controllably applied to the electrically responsive component, in relation to the sensed angular position of the nose, to control an attitude of the nose during flight of the projectile.

20 Claims, 5 Drawing Sheets

OTHER PUBLICATIONS

Post-Buckled Precompressed (PBP) Actuators: Enhancing VTOL Autonomous High Speed MAVs by Ron Barrett; 46$^{th}$ AIAA/ASMA/ASCE/AHS/ASC Structures, Structural Dynamics & Materials Conference Apr. 18-21, 2005, Austin, Texas.

Active Structures Using Buckling Beam Actuators by Eric M. Mockensturm; Jie Jiang; 44$^{th}$ AIAA/ASME/ASCE/AHS Structures, Structural Dynamics and Materials Conference; Apr. 7-10, 2003, Norfolk, Virginia.

Improvement of actuation displacement of LIPCa implementing bifurcation phenomena by Quoc Viet Nguyen, Seungsik Lee, Hoon Cheol Park; Smart Structures and Materials 2006; Active Materials: Behavior and Mechanics, edited by William D. Armstrong, Proc. of SPIE vol. 6170, 6170L (2006).

"Can a Coupling Coefficient of a Piezoelectric Device Be Higher Than Those of Its Active Material?" by George A. Lesieutre and Christopher L. Davis; reprinted from Journal of Intelligent Materials Systems and Structures, vol. 8-Oct. 1997.

A Centrally-Clamped Parallel-Beam Bistable MEMS Mechanism by Jin Qiu, Jeffrey H. Lang, Alexander H. Slocum; 0-7803-5998-4/1/$10.00@2001IEEE.

A Curved-Beam Bistable Mechanism by Jin Qiu, Jeffrey H. Lang, Alexander H. Slocum; 1057-7157/04$20.00 copyright 2004IEEE.

Shoesmith, Ben et al. "CFD Analysis Of A Supersonic Projectile With Deflectable Nose Control", 3$^{rd}$ AIAA Flow Control Conference; San Francisco, CA; Jun. 5-8, 2006, pp. 1-14.

* cited by examiner

SYSTEM AND METHOD FOR CONTROLLING HIGH SPIN RATE PROJECTILES

FIELD

The present disclosure relates generally to projectiles, and more particularly to a system and method for controlling flight of a spinning projectile.

BACKGROUND

The statements in this section merely provide background information related to the present disclosure and may not constitute prior art. There presently is increasing interest in being able to control the trajectory of projectiles while same are in flight. For example, there is significant interest in being able to control the trajectory of a large caliber bullet, for example a .50 caliber bullet fired from a rifle or automatic weapon. It is known that as a bullet leaves the weapon from which it is fired, it will have a high rate of spin. Typically a .50 caliber bullet may be spinning at or above about 150,000 rpm as it moves through the atmosphere and is nearly constant throughout the flight. With a spinning bullet, the use of fins to modify its flight trajectory after it leaves the weapon is not a viable option for controlling the flight of the spinning bullet. This is because the fins must respond to the complex airflow at an extremely high rate of speed, which can not be supported by available actuation technology. Some control scheme and/or method for controlling the orientation of the nose of the bullet during its flight would enable the trajectory of the bullet to be controlled to a higher degree of accuracy.

SUMMARY

In one aspect the present disclosure relates to a method for controlling a flight trajectory of a spinning projectile. The method may comprise supporting a nose of the projectile in a manner permitting the nose to be wobbled; coupling at least one electrically responsive component at a first end to the nose and at a second end to a base portion of the projectile; sensing a rate of spin of the projectile as the projectile flies through an atmosphere after being fired from a weapon; and controllably applying an electrical signal to the electrically responsive component, in relation to the sensed rate of spin, to control an attitude of the nose during flight of the projectile.

In another aspect a method is disclosed for controlling a flight trajectory of a spinning projectile. The method may comprise supporting a nose of the projectile in a manner permitting the nose to be wobbled; supporting the nose by a plurality of circumferentially spaced apart, electrically responsive components; detecting when the projectile has been fired from a weapon; sensing an angular position of the nose and a rate of spin of the projectile as the projectile flies through an atmosphere after being fired from the weapon; and controllably applying electrical signals having different phases to the plurality of electrically responsive components, in relation to the sensed angular position of the nose, to control an attitude of the nose during flight of the projectile.

In still another aspect of the present disclosure a system is disclosed for controlling a flight trajectory of a spinning projectile. The system may comprise a projectile having a nose and a body portion, with the nose portion being supported for movement relative to the body; a plurality of electrically responsive components coupled between the nose and the body portion; and a subsystem that senses an angular position of the nose after the projectile has been fired from a weapon and generates electrical signals that are applied to the electrically responsive components to counteract the wobbling motion to maintain the nose in a relatively constant, desired attitude during flight of the projectile.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
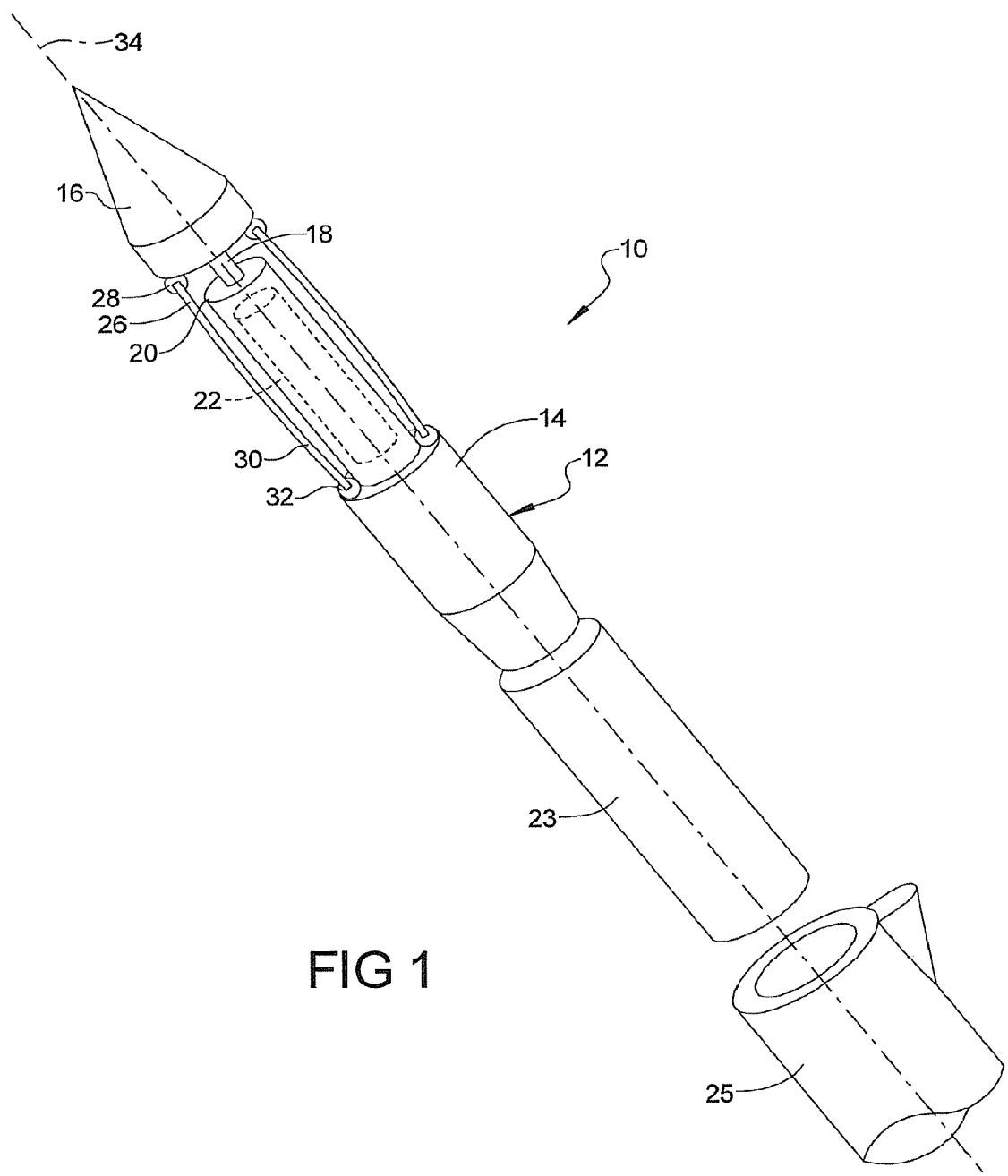
FIG. 1 is a perspective exploded view of a projectile in accordance with one embodiment of the present disclosure.

Referring to FIG. 1, there is shown a system 10 for changing the angle of a nose of a bullet, relative to the body, while the bullet is in flight to control the trajectory of the bullet. In general, the nose of the bullet is rotated in accordance with a generally constant nose angle, smoothly relative to the bullet body, with a rotation rate equal to but in opposite direction as the rotation rate of the bullet. This enables the bullet to appear to have a bent nose that is constant in its orientation relative to an air stream through which it flies, and thus can be used to control the trajectory of the bullet after it leaves the barrel of a weapon.

In FIG. 1, the system 10 involves the use of a projectile 12 having a body portion 14, a nose 16, and a reduced diameter portion 18 for supporting the nose 16 from the body portion 14. The reduced diameter portion 18 is preferably made from a material that is slightly flexible, such as high strength steel. An electronic subsystem 22 is located within a central portion 20 of the body portion 14 for controlling a wobbling motion (i.e., deflection) of the nose 16 as the projectile 12 is in flight. In one form the projectile 12 may comprise a bullet, for example a .50 caliber round of ammunition that is fired from a rifle, automatic weapon, or any other suitable weapon. The system 10 is not limited to use with any one caliber of projectile, but rather may be incorporated into larger or smaller caliber projectiles. However, with the long useable range of a .50 caliber bullet, which may extend for one mile or longer, the accuracy provided by the present system 10 is expected to significantly enhance the effectiveness of such a projectile and its corresponding weapon. The projectile 12 may be substantially enclosed within a conventional casing 23 before being fired from a weapon 25.

With further reference to FIG. 1, the nose 16 is also supported by three electrically responsive components 24a, 24b and 24c. In one embodiment the electrically responsive components 24a-24c may comprise piezoceramic actuators, however, any form of electrically responsive materials may be used, provided they have the ability to alter their shape in response to an electrical signal. For convenience, the electrically responsive components 24a-24c will be referred to throughout the following discussion simply as "piezoceramic actuators" 24a-24c.

Figure 2:
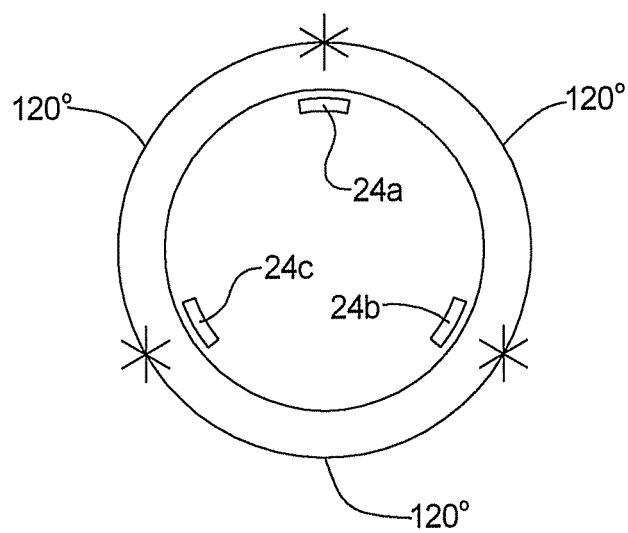
FIG. 2 is an end, showing the orientation of the three electrically responsive components that are coupled to the nose of the projectile.

The piezoceramic actuators 24a-24c each may be shaped like a beam. Each is further coupled at a first end 26 to an associated coupling element 28, and at a second end 30 to a coupling element 32. The coupling elements 28 and 30 are fixedly secured either by suitable adhesives or mechanical fasteners to the nose 16 and body portion 14 respectively. As shown in FIG. 2, the piezoceramic actuators 24a-24c are further arranged so that they spaced apart preferably about 120 degrees from one another around the circumference of the nose 16.

As will be described in more detail in the following paragraphs, the piezoceramic actuators 24a-24c are controllably actuated to cause the nose 16 to be tilted (or deflected) away from the axial center 34 of the projectile 12 during flight. This is highly useful in controlling the trajectory of the projectile 12. As will be appreciated, a projectile such as a bullet typically exits the barrel of the weapon from which it was fired with a high degree of spin. The rate of spin may be up to 15,000 rpm or even higher. Typically the nose of a bullet will begin to "wobble" slightly as it flies through the atmosphere after leaving the barrel. By "wobble", it is meant that the axial center of the nose of the bullet moves through and around the generally linear path that the bullet is travelling. As the bullet travels towards its intended target the amount of wobble of the nose typically gets worse. Depending on the distance to the target and the atmospheric conditions present, such as wind, rain, snow, etc., the wobble may become significantly pronounced. Eventually, the bullet may actually begin tumbling end over end before it reaches its intended target. Obviously, the greater the degree of wobble of the nose during flight, generally the greater the loss of accuracy of the bullet that will be experienced.

Figure 3:
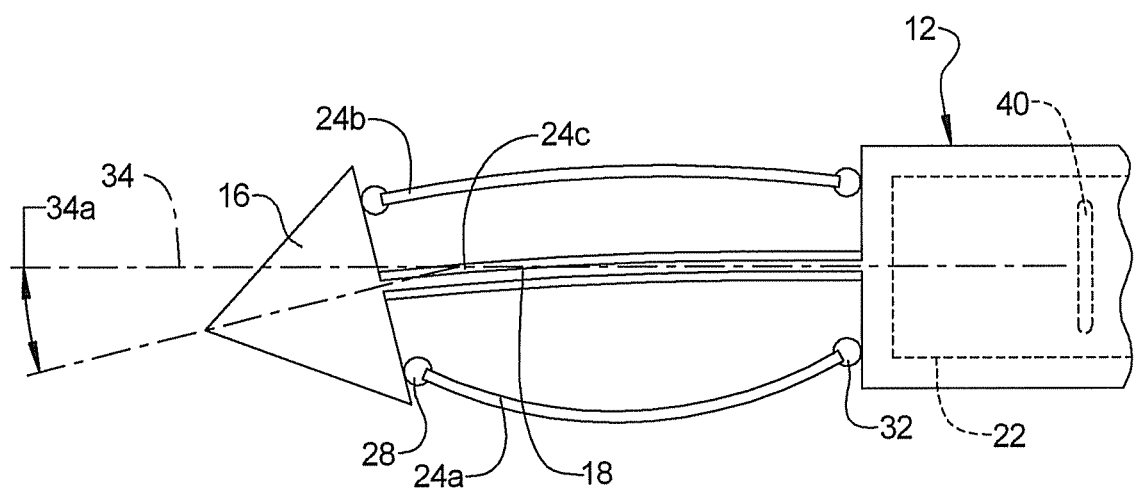
FIG. 3 is a side view of the projectile of FIG. 2.

With brief reference to FIG. 3, for example, when piezoceramic actuator 24a is actuated, it bows or "buckles", causing it to pull the nose 16 of the projectile 12 away from the axial center 34 of the projectile 12. Depending which one piezoceramic actuator 24 (or pair of actuators 24) is actuated, the nose 16 will be deflected in an intended direction. This controlled deflection or controlled wobble of the nose 16 is used to effectively cancel the wobble that the nose 16 of the projectile 12 would otherwise experience during flight if the piezoceramic actuators 24a-24c were not being used. Selectively actuating specific ones of the piezoceramic actuators 24a-24c allows the nose 16 of the projectile to be kept in a constant orientation, relative to a reference surface (e.g., a ground surface). This can significantly enhance the accuracy of the projectile 12.

It will also be appreciated that while the piezoceramic actuators 24a-24c are shown in linear orientations in FIGS. 1 and 2, that the actuators could just as readily be configured so that they assume a normally bowed or buckled shape. Then, straightening out any given one of the piezoceramic actuators 24a-24c, either by applying a suitable electrical signal or removing an electrical signal, could achieve the desired deflection of the nose 16 described above. It will also be appreciated that while three piezoceramic actuators 24a-24c are illustrated, that a greater or lesser plurality of actuators could be employed. The number of piezoceramic actuators 24 used will affect the degree of precision by which the nose 16 can be deflected. However, the greater the number of actuators 24 used the greater the complexity and cost of the signal processing electronics that will likely be required.

Figure 4:
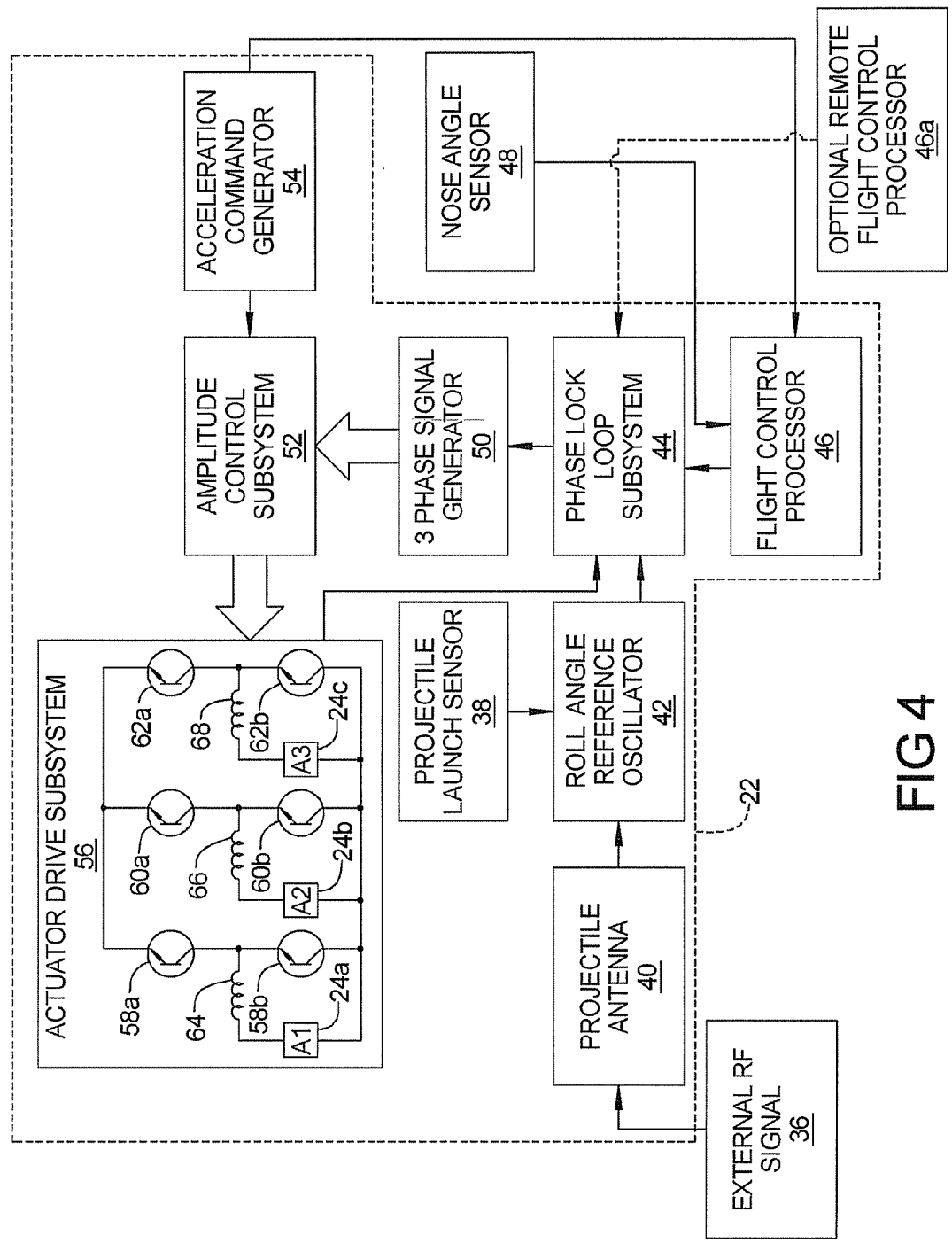
FIG. 4 is a block diagram of the electronic subsystem of the system along with other components that may be used by the system.

Referring now to FIG. 4, a more detailed illustration of one embodiment of the electronic subsystem 22 of the system 10 is shown. Initially, it will be appreciated that the system 10 includes an external signal source 36 for supplying a wireless signal that may be used by the system 10 in implementing control of the piezoceramic actuators 24a-24c. The wireless signal is preferably an electromagnetic wave signal (e.g., an RF signal). A projectile launch sensor 38 is physically attached to the weapon that is used to fire the projectile 12 so that the recoil of the weapon can be sensed, and the approximate instant that firing occurs can be detected. The launch sensor 38 may be a strain gauge or any other suitable form of sensor, for example a sensor formed from a piezoelectric polymer such as a polyvinylidene fluoride (PVDF). Such a sensor is commercially available from Ktech Corporation of Albuquerque, N. Mex. Alternatively it be an electrically isolated section of the piezoceramic material or the bimorph beam itself which is able to detect the firing (i.e., recoil) of the projectile.

The electronic subsystem 22 includes an antenna, which is also shown in FIG. 3. The antenna, as shown in FIG. 3, is preferably orientated perpendicular to the axial center of the projectile 12. The signal being emitted from the external signal source 36 may be a polarized signal, for example a vertically polarized signal. Thus, the strength of the signal received by the antenna 40 will vary significantly, and in a cyclic manner, as the physical orientation of the projectile 12 changes when the projectile spins during flight. This is because the physical orientation of the antenna 40 will be continuously changing such that a signal of increasing strength, and then decreasing strength, will be received, in an alternating fashion. The frequency of the cyclic signal will also be in accordance with the spin rate of the projectile 12. The antenna 40 may comprise a patch antenna that is linearly polarized. Alternatively, a magnetic sensor may be used in place of the antenna 40 and external RF signal 36. The magnetic sensor may sense the Earth's magnetic field as it spins and the sensor may generate a sinusoidally varying output waveform that is referenced to the spin rate, and also to the roll angle, of the projectile 12.

The electronic subsystem 22 may include a roll angle reference oscillator 42, a phase lock loop subsystem 44, a flight control processor 46, a nose angle sensor 48, a three phase signal generator 50, an amplitude control subsystem 52, an acceleration command generator 54 and an actuator drive subsystem 56. The roll angle reference oscillator 42 receives the varying output signal from the antenna 40 and the launch signal from the launch sensor 38. Upon receiving the launch signal, the roll angle reference oscillator 42 begins generating a sinusoidally varying (i.e., oscillating) reference signal having a frequency that is tied to the spin rate of the projectile 12, and which is also indicative of the roll angle of the projectile 12. Thus, if the spin rate of the projectile 12 as the projectile leaves the weapon is 150,000 rpm, then the frequency of the output signal from the roll angle reference oscillator 42 may be 2.5 Khz. Also, since one revolution of the projectile 12 will represent one cycle of the oscillator's 42 signal, this sinusoidal signal forms a measure of the projectile roll angle at any given instant.

The nose angle sensor 48 supplies signals relating to the angle of the nose wobble at any given instant to the flight control processor 46. One implementation is to electrically isolate a small section of the piezoceramic material located on each piezoceramic actuator 24, thus forming a strain sensor that measures the deflection of the piezoceramic actuator 24, and hence the angle between the nose 16 and the bullet body portion 14. The angle of wobble of the nose 16 of the projectile 12 is relative to the axial center of the body portion 14.

The output of the roll angle reference oscillator 42 is fed to an input of the phase lock loop (PLL) subsystem 44. The PLL subsystem 44 also receives an output from the flight control processor 46 and from the actuator drive subsystem 54. The flight control processor 46 provides the phase offset commands that are used by the PLL subsystem 44 to generate the needed phase control signals to the three phase signal generator 50. Put differently, the signal output from the flight control processor 46 represents the desired phase difference (i.e., offset), at a given time, between the phase angle of the sinusoidal output from the roll angle reference oscillator 42 and the projectile nose wobble output from the nose angle sensor 48. Essentially, the flight control processor 46 provides an input signal to the PLL subsystem 44 that tells the PLL subsystem what is the offset phase of the electrical signals that that need to be generated to offset the wobble of the nose 16 and to maintain the nose at a desired angle relative to a reference surface. For example, in FIG. 3, the desired angle 34*a* of the nose 16 may be preselected to be 20 degrees. The flight control processor 46 would then be programmed to provide the offset needed to maintain the nose at the desired 20 degree angle. The precise angle selected may depend on various factors, including the type of projectile (e.g., caliber) being used, or possibly even the environment in which the projectile is being used (e.g., in windy, rainy weather).

An option is a remote flight control processor 46*a*. A remote flight control processor would receive wireless signals, for example wireless RF signals, from the nose angle sensor 48 and the acceleration command generator 54, and send wireless phase offset signals back to the PLL subsystem 44 to control angular orientation of the nose 16 of the projectile 12. The remote flight control processor 46*a* could be located on a mobile platform or at a stationary location, such as a nearby command facility.

Returning to FIG. 4, the PLL subsystem 44 generates the phase control signals that the three phase signal generator 50 uses to generate the three phase electrical signals that are used for controlling the piezoceramic actuators 24*a*-24*c*. The output signals from the three phase signal generator 50 are modified by the amplitude control subsystem 52, based on the desired normal acceleration of the nose 16. The amplitude control subsystem 52 output signals may be generated by a suitable guidance algorithm used therewith. Thus, when the acceleration of the projectile 12 is at a maximum value, and the wobble of the nose 16 is expected to be at its lowest magnitude, the acceleration command generator may not attenuate the signals output from the three phase signal generator 50 at all. But as the projectile 12 flies along it path of travel, the acceleration command generator 54 may signal to the amplitude control subsystem 52 to slightly increase the magnitudes of the output signals being provided to the actuator drive subsystem 56. This allows the amplitude of the drive signals to be tailored to the speed of the projectile 12.

Figure 5A:
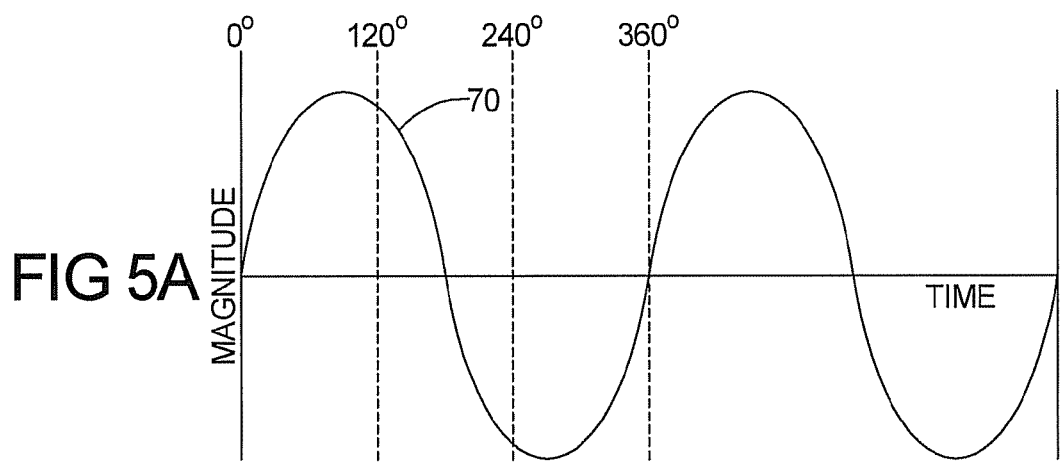
FIGS. 5A-5C are waveforms illustrating the phase differences between exemplary switching signals that may be applied to each of the piezoceramic actuators.
Figure 5B:
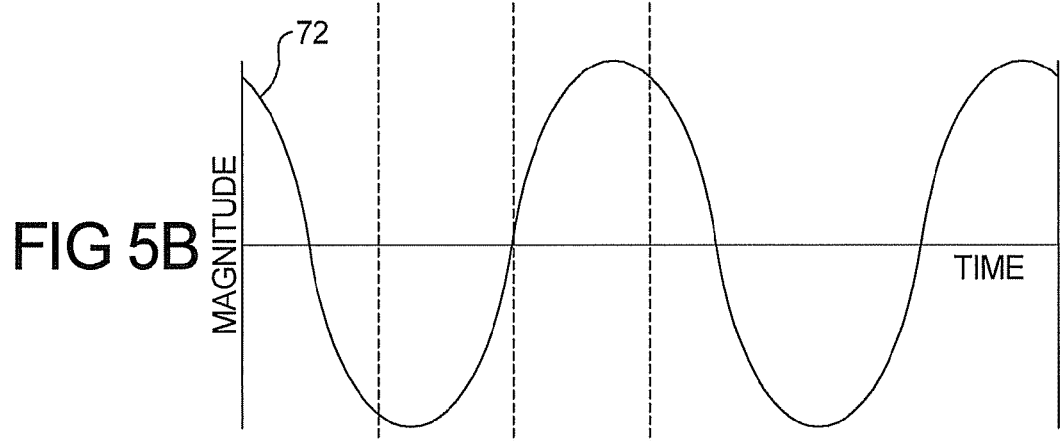
Figure 5C:
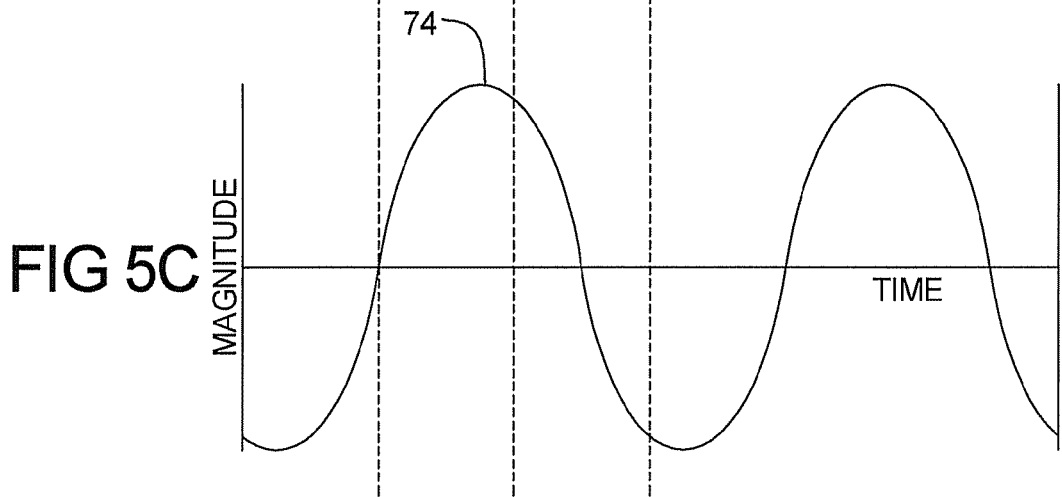

Referring further to FIG. 4, the actuator drive subsystem 56 can be seen to include switching elements 58*a*,58*b*, 60*a*,60*b*, and 62*a*-62*b*. An inductor 64 is disposed between the two switching elements 58*a* and 58*b*. A second inductor 66 is disposed between the two switching elements 60*a* and 60*b*, and a third inductor 68 is disposed between the switching elements 62*a* and 62*b*. The inductors 64, 66 and 68 take the switching signals from the amplitude control subsystem 52 and help to provide sinusoidal electrical switching signals to the piezoceramic actuators 24*a*-24*c*. The output signals from the amplitude control subsystem 52 control the switches associated with each of the piezoceramic actuators 24*a*-24*c*. In effect, the switching signals applied to the switches 60*a*,60*b* will be 120 degrees out of phase (e.g., advanced), from those applied to switches 58*a*,58*b*. The signals applied to switches 62*a*,62*b* will be 120 out of phase (e.g., advanced) from those applied to switches 60*a*, 60*b*. Referring briefly to FIGS. 5A-5C, one example of the switching signals is shown. Switching signal 70 may be applied to piezoceramic actuator 24*a*, switching signal 72 to piezoceramic actuator 24*b* and switching signal 74 to piezoceramic actuator 24*c*. Signal 72 is advanced 120 degrees in phase from signal 70, and signal 74 is advanced 120 degrees in phase from signal 72.

Figure 6:
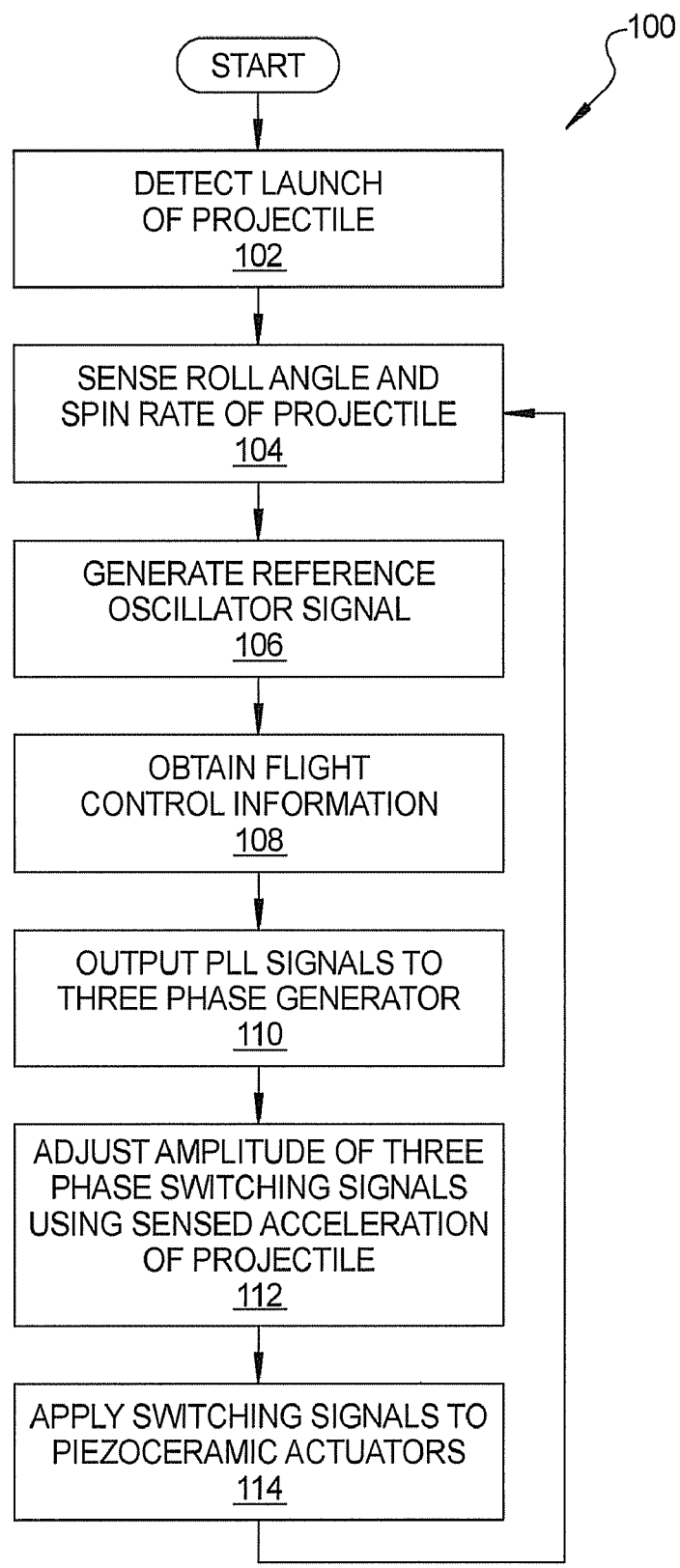
FIG. 6 is a flowchart of operations performed by the system in controlling the attitude of the nose of the projectile during its flight.

Referring to FIG. 6, a flowchart 100 is shown illustrating exemplary operations that the system 10 may perform in controlling the flight of the projectile 12. Initially, at operation 102, the launch of the projectile 12 is first detected. At operation 104 the roll angle and spin rate of the projectile 12 is sensed. At operation 106 the roll angle and spin rate are used by the roll angle reference oscillator 42 to generate the roll angle reference signal. At operation 108 the needed flight control information is obtained from the flight control processor 46. At operation 110 the PLL subsystem 44 generates the PLL signals that are used by the three phase signal generator 50. At operation 112 the magnitudes of the three phase switching signals from the three phase signal generator 50 are adjusted in relation to the acceleration of the projectile 16. At operation 114 the amplitude adjusted switching signals are applied to the piezoceramic actuators 24*a*-24*c*.

The system 10 and method of the present disclosure enables the attitude of the nose of a projectile to be maintained at a desired attitude over the course of its flight, relative to some external reference line, for example a ground surface, over which the projectile is travelling. This can significantly increase the accuracy of the projectile.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for controlling a flight trajectory of a spinning projectile, comprising:

supporting a nose of said projectile in a manner permitting said nose to be wobbled relative to a base portion of the projectile;

coupling at least one electrically responsive component at a first end to said nose and at a second end to said base portion of said projectile;

sensing an angular position of said nose of said projectile as said projectile flies through an atmosphere after being fired from a weapon; and controllably applying an electrical signal to said electrically responsive component, in relation to said sensed angular position of said nose, to control an attitude of said nose during flight of said projectile.

2. The method of claim 1, wherein said electrical signal causes said electrically responsive component to maintain said nose at a generally constant attitude relative to an external reference surface as said projectile spins during flight.

3. The method of claim 2, wherein said nose is controlled to assume a generally continuously, slightly downwardly pointed orientation relative to a ground surface over which said projectile travels.

4. The method of claim 1, wherein said coupling at least one electrically responsive component to said nose comprises coupling a piezoceramic beam to said nose.

5. The method of claim 1, wherein said coupling at least one electrically responsive component to said nose comprises coupling a plurality of three piezoceramic beams between said nose and said base of said projectile.

6. The method of claim 5, wherein said coupling a plurality of three piezoceramic beams between said nose and said base of said projectile comprises coupling said plurality of three piezoceramic beams such that any two adjacent ones of said piezoceramic beams are circumferentially offset by about 120 degrees from one another around a perimeter of said projectile.

7. The method of claim 1, further comprising using a sensor to detect when said projectile has been fired from said weapon.

8. The method of claim 1, further controlling an amplitude of said electrical signal in relation to a sensed acceleration of said projectile.

9. A method for controlling a flight trajectory of a spinning projectile, comprising:
   supporting a nose of said projectile in a manner permitting said nose to be wobbled;
   supporting said nose by a plurality of circumferentially spaced apart, electrically responsive components;
   detecting when said projectile has been fired from a weapon;
   sensing an angular position of said nose and a rate of spin of said projectile as said projectile flies through an atmosphere after being fired from said weapon; and
   controllably applying electrical signals having different phases to said plurality of electrically responsive components, in relation to said sensed angular position of said nose, to control an attitude of said nose during flight of said projectile.

10. The method of claim 9, wherein said supporting said nose by a plurality of circumferentially spaced apart electrically responsive components comprises supporting said nose by a plurality of piezoceramic beams.

11. The method of claim 10, further comprising supporting said piezoceramic beams such that adjacent ones of said piezoceramic beams are arranged approximately 120 degrees from one another circumferentially about a perimeter of said projectile.

12. The method of claim 9, wherein said controllably applying electrical signals comprises controllably applying electrical signals having three different phases to three different ones of said electrically responsive components.

13. The method of claim 9, further comprising sensing an acceleration of said projectile and controlling an amplitude of said electrical signals in relation to said sensed acceleration.

14. The method of claim 9, wherein said sensing a rate of spin of said projectile comprises:
   using an antenna carried on said projectile to receive an external electromagnetic wave signal, with a changing orientation of said antenna as said projectile spins while travelling causing said antenna to generate a periodic signal representative of a rate of rotation of said projectile; and
   wherein said periodic signal is used to assist in generating said electrical signals.

15. The method of claim 14, further comprising using a reference oscillator to receive said periodic signal and to generate a sinusoidal output signal for assisting in controlling the generation of said electrical signals.

16. The method of claim 9, wherein said supporting a nose of said projectile in a manner enabling said nose to be wobbled comprises supporting a nose of a bullet in a manner permitting said nose of said bullet to be wobbled.

17. A system for controlling a flight trajectory of a spinning projectile, comprising:
   a projectile having a nose and a body portion, with the nose portion being supported for movement relative to the body portion;
   a plurality of electrically responsive components coupled between said nose and said body portion; and
   a subsystem that senses an angular position of said nose after said projectile has been fired from a weapon and generates electrical signals that are applied to said electrically responsive components to counteract said wobbling motion to maintain said nose in a relatively constant, desired attitude during flight of said projectile.

18. The system of claim 17, wherein said subsystem comprises an antenna carried on said projectile for receiving an external electromagnetic signal, said antenna generating a cyclic signal as said projectile rolls during flight, and
   wherein said subsystem further includes an oscillator responsive to said cyclic signal for generating a sinusoidal electrical signal representing of a frequency of rotation of said projectile during flight of said projectile.

19. The system of claim 18, wherein said subsystem comprises an accelerometer for detecting an acceleration of said projectile; and
   an amplitude control responsive to an output of said accelerometer for adjusting an amplitude of said electrical signals applied to said electrically responsive components in accordance with a sensed acceleration of said projectile.

20. The system of claim 18, wherein said electrically responsive components each comprise piezoceramic beams that flex when receiving one of said electrical signals, said flexing adapted to deflect said nose of said projectile in a desired direction.

* * * * *